US010209340B2

(12) United States Patent
Amizur et al.

(10) Patent No.: US 10,209,340 B2
(45) Date of Patent: Feb. 19, 2019

(54) APPARATUS, SYSTEM AND METHOD OF A ONE-SIDED LOCATION MEASUREMENT

(71) Applicant: INTEL IP CORPORATION, Santa Clara, CA (US)

(72) Inventors: Yuval Amizur, Kfar-Saba (IL); Nir Dvorecki, Herzeliya (IL); Leor Banin, Petach Tikva (IL)

(73) Assignee: INTEL IP CORPORATION, Santa Clara, CA (US)

( * ) Notice: Subject to any disclaimer, the term of this patent is extended or adjusted under 35 U.S.C. 154(b) by 167 days.

(21) Appl. No.: 15/281,105

(22) Filed: Sep. 30, 2016

(65) Prior Publication Data

US 2017/0295558 A1 Oct. 12, 2017

Related U.S. Application Data

(60) Provisional application No. 62/319,409, filed on Apr. 7, 2016.

(51) Int. Cl.
*H04W 64/00* (2009.01)
*G01S 5/02* (2010.01)
*H04L 25/02* (2006.01)

(52) U.S. Cl.
CPC .......... *G01S 5/021* (2013.01); *H04L 25/0226* (2013.01)

(58) Field of Classification Search
CPC ....... G01S 5/021; H04B 7/0452; H04B 17/00; H04B 3/46; H04L 25/0226; H04L 5/0053; H04L 43/00; H04L 43/50; H04W 64/00; H04W 76/27; H04W 24/00

USPC .......................................................... 370/252
See application file for complete search history.

(56) References Cited

U.S. PATENT DOCUMENTS

| 2014/0185709 | A1  | 7/2014  | Amizur |
| 2014/0247746 | A1* | 9/2014  | You ...................... H04W 48/16 370/252 |
| 2014/0301219 | A1* | 10/2014 | Ben-Haim ................ G01S 5/14 370/252 |

(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Robert J Lopata
(74) *Attorney, Agent, or Firm* — Shichrur & Co.

(57) ABSTRACT

Some demonstrative embodiments include apparatuses, devices, systems and methods of one-sided location measurement. For example, an apparatus may include circuitry and logic configured to cause a wireless station to transmit an announcement element to announce a Non-Data Packet (NDP) sounding transmission including a plurality of sounding preambles, the announcement element including at least a measurement type field to indicate a type of a one-sided location measurement, and one or more configuration fields including configuration information to configure the one-sided location measurement based on the NDP sounding transmission; and to transmit the NDP sounding transmission subsequent to the announcement element.

24 Claims, 10 Drawing Sheets

(56) References Cited

U.S. PATENT DOCUMENTS

| | | | | |
|---|---|---|---|---|
| 2014/0327579 | A1* | 11/2014 | Hart | G01S 3/48 |
| | | | | 342/374 |
| 2015/0237513 | A1* | 8/2015 | Garrett | H04L 25/0224 |
| | | | | 370/252 |
| 2015/0312875 | A1* | 10/2015 | Bhanage | H04B 17/20 |
| | | | | 455/456.1 |
| 2015/0372795 | A1* | 12/2015 | Wu | H04L 5/0057 |
| | | | | 370/329 |
| 2016/0366548 | A1* | 12/2016 | Wang | H04W 64/00 |
| 2016/0380729 | A1* | 12/2016 | Porat | H04B 7/0408 |
| | | | | 370/329 |
| 2017/0215087 | A1* | 7/2017 | Amizur | H04W 4/025 |
| 2017/0251449 | A1* | 8/2017 | Malik | H04W 64/003 |

OTHER PUBLICATIONS

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

* cited by examiner though it will be unof the following the ordinary# APPARATUS, SYSTEM AND METHOD OF A ONE-SIDED LOCATION MEASUREMENT

CROSS REFERENCE

This Application claims the benefit of and priority from U.S. Provisional Patent Application No. 62/319,409 entitled "APPARATUS, SYSTEM AND METHOD OF ONE-SIDED WIRELESS TIMING AND/OR ANGLE MEASUREMENT", filed Apr. 7, 2016, the entire disclosure of which is incorporated herein by reference.

TECHNICAL FIELD

Embodiments described herein generally relate to a one-sided location measurement.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
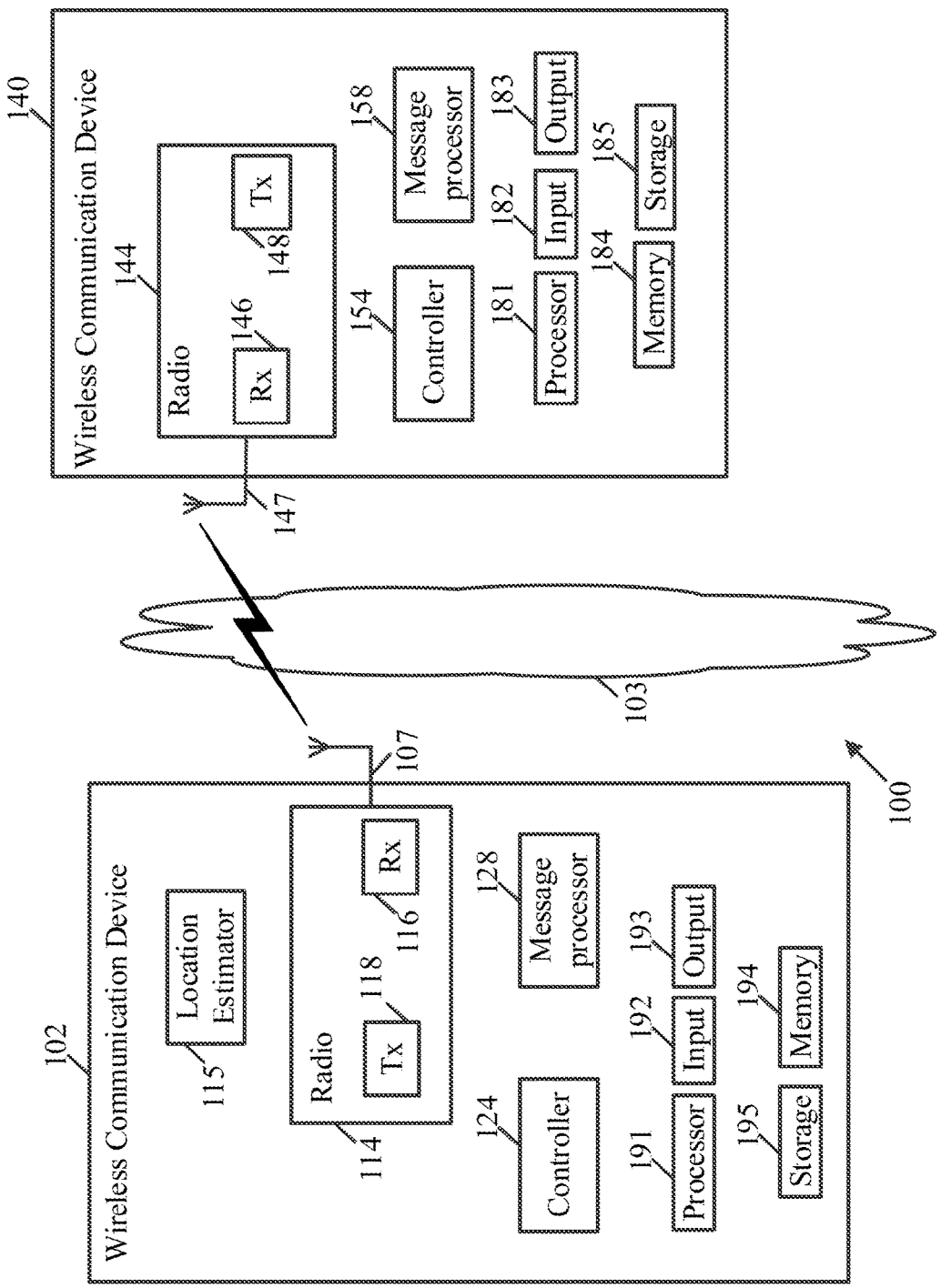
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks Specific Requirements—Part 11: Wireless LAN Medium Access Control (MAC) and Physical Layer (PHY) Specifications—Amendment 4: Enhancements for Very High Throughput for Operation in Bands below 6GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 December, 2012); IEEE-802.11REVmc ("IEEE 802.11-REVmc™/ D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); and/or IEEE 802.11az (IEEE 802.11az, Next Generation Positioning)) and/or future versions and/or derivatives thereof, devices and/or networks operating in accordance with existing WiFi Alliance (WFA) Specifications (including Wi-Fi Neighbor Awareness Networking (NAN) Technical Specification, Version 1.0, May 1, 2015) and/or future versions and/or derivatives thereof, devices and/or networks operating in accordance with existing WFA Peer-to-Peer (P2P) specifications (including WiFi P2P technical specification, version 1.5, Aug. 4, 2014) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, a sub 1 GHz (S1G) frequency band, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices capable of communicating content, data, information, audio, video, and/or signals via a wireless medium (WM) 103. For example, system 100 may include a wireless communication device 102, and/or a wireless communication device 140.

In some demonstrative embodiments, wireless medium 103 may include, for example, a radio channel, an RF channel, a Wireless Fidelity (WiFi) channel, a cellular channel, an IR channel, and the like. One or more elements of system 100 may optionally be capable of communicating over any suitable wired communication links.

In some demonstrative embodiments, device 102 may include a mobile or a portable device.

In some demonstrative embodiments, device 102 may include, for example, a User Equipment (UE), a Mobile device (MD), a wireless Station (STA), a mobile computer, a laptop computer, an Internet of Things (IoT) device, a sensor device, a notebook computer, a tablet computer, an Ultrabook™ computer, a mobile internet device, a handheld computer, a handheld device, a PDA device, a handheld PDA device, an on-board device, an off-board device, a hybrid device (e.g., combining cellular phone functionalities with PDA device functionalities), a consumer device, a mobile or portable device, a mobile phone, a cellular telephone, a PCS device, a PDA device which incorporates a wireless communication device, a mobile or portable GPS device, a relatively small computing device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a gaming device, a Smartphone, or the like.

In some demonstrative embodiments, device 140 may include, perform a role of, and/or may perform the functionality of, an Access Point (AP) station (STA).

In some demonstrative embodiments, device 102 may include, perform a role of, and/or perform the functionality of, a non-AP STA.

In some demonstrative embodiments, device 140 may include a non-mobile or a static device.

In some demonstrative embodiments, device 140 may include, for example, a desktop computer, a router, a server, and/or any other device configured to perform the functionality of an AP.

In some demonstrative embodiments, device 140 may include, operate as, or perform the functionality of a positioning station, for example, a responder station ("responder STA" or "responder").

Some demonstrative embodiments are described herein with respect to a client device performing positioning measurements with respect to an AP. In other embodiments, the client device may perform positioning measurements with respect to any other device, for example, a positioning station, e.g., a responder device, which may or may not have capabilities of an AP, for example, a dedicated responder device, which may be dedicated for wireless positioning, e.g., a dedicated WiFi responder.

In other embodiments, device 140 may include, or may perform the functionality of a non-AP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication medium 103 may include a wireless communication channel over a 2.4 GHz frequency band, a 5 GHz frequency band, a millimeterWave (mmWave) frequency band, e.g., a 60 GHz frequency band, a S1G band, and/or any other frequency band.

In some demonstrative embodiments, wireless communication device 102, and/or wireless communication device 140 may include one or more radios including circuitry and/or logic to perform wireless communication between wireless communication device 102, wireless communication device 140 and/or one or more other wireless communication devices. For example, wireless communication device 102 may include a radio 114, and/or wireless communication device 140 may include a radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, a S1G band, a directional band, e.g., an mmWave band, and/or any other band.

In some demonstrative embodiments, radios 114 and/or 144 may include, or may be associated with, one or more antennas 107 and/or 147, respectively.

In one example, wireless communication device 102 may include a single antenna 107. In another example, wireless communication device 102 may include two or more antennas 107.

In one example, wireless communication device 140 may include a single antenna 147. In another example, wireless communication device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other network.

In some demonstrative embodiments, device 102 may include a location estimator 115 configured to estimate a location of device 102, e.g., as described below.

In some demonstrative embodiments, location estimator 115 may include circuitry and/or logic, e.g., processor circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with device 140 and/or one or more other devices.

In some demonstrative embodiments, location estimator 115 may be configured to determine a location of device

102, for example, using a plurality of ranges from the plurality of other STAs, e.g., by performing trilateration.

In some demonstrative embodiments, the time based range measurements may be performed using WLAN communications, e.g., WiFi. For example, using WiFi to perform the time based range measurements may enable, for example, increasing an indoor location accuracy of the location estimation of device 102, e.g., in an indoor environment.

In some demonstrative embodiments, the time based range measurements may include a round trip time (RTT) measurement (also referred to as Time of Flight (ToF), or Fine Time Measurement (FTM)).

In some demonstrative embodiments, the FTM protocol may be implemented as part of a Specification or protocol, for example, an IEEE 802.11 Specification, for example, by a task group dealing with WiFi positioning, e.g., in a future IEEE 802.11az—Next Generation Positioning Specification.

In some demonstrative embodiments, devices 102 and/or 140 may be configured to perform, allow, and/or support, positioning, for example, WiFi positioning, e.g., next generation positioning, for example, to be implemented by and/or supported by an IEEE 802.11 Specification, e.g., a future IEEE 802.11az Specification, and/or any other specification, standard, and/or protocol.

In some demonstrative embodiments, devices 102 and/or 140 may be configured to perform, allow, and/or support, one or more positioning operations configured to allow at least improved scalability.

In some demonstrative embodiments, the wireless positioning protocol may provide one or more advantages and/or benefits, and/or may solve one or more problems of one or more positioning mechanisms, e.g., as described below.

For example, an FTM protocol, for example, in accordance with an IEEE 802.11REVmc Specification, may include a two-sided implementation, which may utilize transmissions exchanged in both ways between a mobile device and an AP. Accordingly, such an FTM protocol may have a limitation in supporting a very large number of users.

In some demonstrative embodiments, a method in which one or more network devices, e.g., APs and/or responders, only transmit, and one or more clients, e.g., mobile devices, only listen, may be very attractive in some cases, for example, in cases, which require supporting a large number of users.

In some demonstrative embodiments, increased scalability may be achieved, for example, by one-sided measurement protocols, in which an AP or responder transmits, e.g., broadcasts, one or more transmissions, while the AP or responder is not required to process transmissions from client devices.

In some demonstrative embodiments, according to Angle of Departure techniques, the AP or responder may be the only one transmitting while multiple clients act as receivers.

In some demonstrative embodiments, ranging may be performed without any transmission from the client device, for example, using a Time Differential of Arrival (TDoA) technique, for example, in case a network of transmitters, e.g., APs or responders, is synchronized.

In some demonstrative embodiments, an AP, e.g., device 140, may be configured to generate and transmit a one-sided non-data-packet (NDP) transmission, which may be configured for one sided location measurements, e.g., as described below.

In some demonstrative embodiments, an AP, e.g., device 140, may be configured to generate and transmit a one-sided NDP transmission, which may be configured for timing and/or angle measurements, e.g., as described below.

In some demonstrative embodiments, the AP, e.g., device 140, may be configured to implement a mechanism for advertising the scheduling of the NDP transmission, e.g., as described below.

In some demonstrative embodiments, device 140 may be configured to transmit an announcement element, e.g., as part of a packet, including information of a format and relevant data for a one-sided location measurement, e.g., as described below.

In some demonstrative embodiments, device 140 may send an NDP transmission to be used for the one-sided location measurement.

In some demonstrative embodiments, a client device or STA, e.g., device 102, may be configured to process the announcement element, and to process one or more timing and/or angle measurements on the NDP transmission, for example, according to information in the announcement element, e.g., as described below.

In one example, the announcement element may be configured to indicate to a receiver, e.g., device 102, a type and/or features of the measurement, and/or how to handle the NDP transmission. According to this example, the receiver, e.g., device 102, may be configured to use the NDP transmission for the actual one-sided location measurement, e.g., based on the information in the announcement element.

In some demonstrative embodiments, the announcement element and the NDP transmission may be transmitted together as a positioning beacon ("P-Beacon") transmission, e.g., as described below.

In some demonstrative embodiments, devices 102 and/or 140 may be configured to perform operations of a one-sided location measurement for location estimation, in which an AP or responder, e.g., device 140, is the only transmitter, e.g., as described below.

In some demonstrative embodiments, the one-sided location measurement for location estimation may support at least two modes for location estimation, for example, a ranging measurement based on a timing difference, and/or an angle measurement, e.g., an Angle of Departure (AoD) measurement, e.g., as described below.

In some demonstrative embodiments, the ranging measurement and/or the angle measurement may be combined into and/or performed based on a single NDP measurement packet, e.g., as described below.

In some demonstrative embodiments, the ranging measurement and the angle measurement may be performed using separate NDP packets, e.g., as described below.

In some demonstrative embodiments, controller 154 may be configured to control, cause and/or trigger device 140 to transmit an announcement element to announce an NDP sounding transmission.

In some demonstrative embodiments, message processor 158 may be configured to generate the announcement element, and/or transmitter 148 may be configured to transmit the announcement element, e.g., as described below.

In some demonstrative embodiments, the NDP sounding transmission may include a plurality of sounding preambles, e.g., as described below.

In some demonstrative embodiments, the announcement element may include at least a measurement type field to indicate a type of a one-sided location measurement, and one or more configuration fields including configuration information to configure the one-sided location measurement, for example, based on the NDP sounding transmission, e.g., as described below.

In some demonstrative embodiments, the type of the one-sided location measurement may include a ranging measurement, an Angle of Departure (AoD) measurement, or a combination of the ranging and AoD measurements ("the combined measurement"), e.g., as described below. In other embodiments, the type of the one-sided location measurement may include any other additional or alternative type of measurement.

In some demonstrative embodiments, controller 154 may be configured to control, cause and/or trigger device 140 to transmit the NDP sounding transmission subsequent to the announcement element, e.g., as described below.

In some demonstrative embodiments, message processor 158 may be configured to generate the NDP sounding transmission including the plurality of sounding preambles, and/or transmitter 148 may be configured to transmit the NDP sounding transmission.

In some demonstrative embodiments, device 102 may receive the announcement element and the NDP sounding transmission from device 140, e.g., as described below.

In some demonstrative embodiments, controller 124 may be configured to control, cause and/or trigger device 102 to process the announcement element from device 140, to announce the NDP sounding transmission including the plurality of sounding preambles, e.g., as described below.

In some demonstrative embodiments, receiver 116 may be configured to receive the announcement element, and/or message processor 128 may be configured to process the announcement element.

In some demonstrative embodiments, controller 124 may be configured to control, cause and/or trigger device 102 to perform the one-sided location measurement by processing the NDP sounding transmission, e.g., from device 140, based on the one or more configuration fields of the announcement element, e.g., as described below.

In some demonstrative embodiments, the announcement element may be included as part of a beacon, e.g., a P-Beacon.

In some demonstrative embodiments, controller 154 may be configured to control, cause and/or trigger device 140 to transmit the announcement element as part of a beacon.

In some demonstrative embodiments, device 102 may receive the announcement element as part of the beacon.

In some demonstrative embodiments, controller 124 may be configured to control, cause and/or trigger device 102 to process the beacon including the announcement element.

In some demonstrative embodiments, transmissions of the announcement element and the NDP sounding transmission may be separate, e.g., as described below In some demonstrative embodiments, controller 154 may be configured to control, cause and/or trigger device 140 to transmit an announcement packet including the announcement element, and, subsequent to the announcement packet, to transmit an NDP including the NDP sounding transmission. In one example, the announcement element and NDP transmission may be transmitted as two broadcast frames.

In some demonstrative embodiments, the NDP may be separated from the announcement packet, for example, by a Short Inter-Frame Space (SIFS), or by any other shorter or longer period.

In some demonstrative embodiments, device 102 may receive the announcement packet including the announcement element, and the NDP including the NDP sounding transmission, subsequent to the announcement packet.

In some demonstrative embodiments, controller 124 may be configured to control, cause and/or trigger device 102 to receive the announcement packet including the announcement element from device 140.

In some demonstrative embodiments, controller 124 may be configured to control, cause and/or trigger device 102 to process the announcement packet including the announcement element from device 140.

In some demonstrative embodiments, controller 124 may be configured to control, cause and/or trigger device 102 to process the NDP including the NDP sounding transmission, for example, subsequent to the announcement packet.

Figure 2:
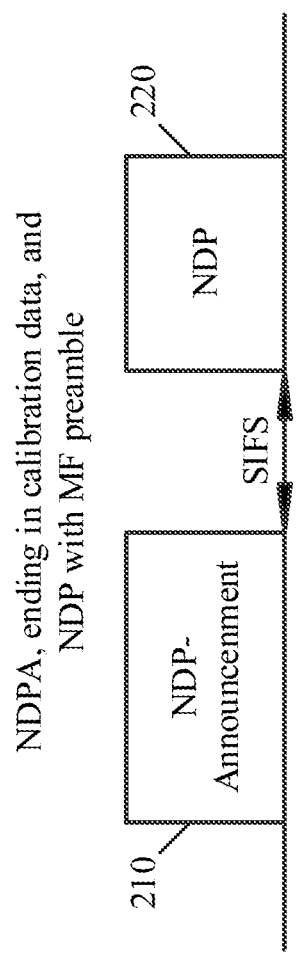
FIG. 2 is a schematic illustration of a transmission of an announcement packet and a Non-Data-Packet (NDP), in accordance with some demonstrative embodiments.

Reference is made to FIG. 2, which schematically illustrates a transmission of an announcement packet 210 and an NDP 220, in accordance with some demonstrative embodiments.

In some demonstrative embodiments, as shown in FIG. 2, NDP 220 may be transmitted subsequent to the announcement packet 210.

In some demonstrative embodiments, as shown in FIG. 2, NDP 220 may be separated from the announcement packet 210 by a SIFS.

In some demonstrative embodiments, an AP or a responder, e.g., device 140 (FIG. 1), may transmit announcement packet 210, and the NDP 220 subsequent to the announcement packet 210.

Referring back to FIG. 1, in some demonstrative embodiments, transmissions of the announcement element and the NDP sounding transmission may be combined, for example, the announcement element and the NDP transmission may be transmitted in a single packet, e.g., as described below.

In some demonstrative embodiments, controller 154 may be configured to control, cause and/or trigger device 140 to transmit a packet including the announcement element.

In some demonstrative embodiments, the packet may include the NDP sounding transmission subsequent to the announcement element.

In some demonstrative embodiments, device 102 may receive the packet including the announcement element and the NDP sounding transmission, e.g., subsequent to the announcement element.

In some demonstrative embodiments, controller 124 may be configured to control, cause and/or trigger device 102 to process the packet including the announcement element and the NDP sounding transmission subsequent to the announcement element.

Figure 3:
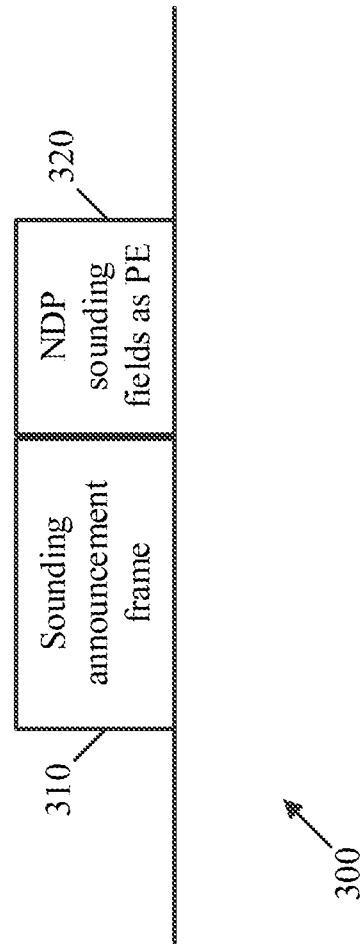
FIG. 3 is a schematic illustration of a packet including an announcement element and an NDP sounding transmission, in accordance with some demonstrative embodiments.

Reference is made to FIG. 3, which schematically illustrates a transmission of a packet 300 including an announcement element and an NDP sounding transmission, in accordance with some demonstrative embodiments.

In some demonstrative embodiments, as shown in FIG. 3, packet 300 may include an announcement frame element 310, and an NDP sounding transmission 320 subsequent to the announcement frame 310.

In some demonstrative embodiments, an AP or a responder, e.g., device 140 (FIG. 1), may transmit a P-Beacon including packet 300.

Referring back to FIG. 1, In some demonstrative embodiments, the announcement element may include one or more fields ("the general fields"), which may be used for all types of the of the one-sided location measurement, for example, the AoD measurement, the ranging measurement, and/or the combined measurement, e.g., as described below.

In one example, the general fields of the announcement element may be common to a plurality of types of measurements, e.g., to some or all types of measurements.

In some demonstrative embodiments, the announcement element may include one or more fields, e.g., after the general fields, including data regarding features of a required measurement type. One or more of these fields and/or features may be different for each type of measurement, and/or one or more of the fields and/or features may be optional, e.g., as described below.

In some demonstrative embodiments, the announcement element may include an NDP mapping field configured to indicate a count of the plurality of sounding preambles, and which sounding preambles may be used for the one-sided location measurement, e.g., as described below.

In some demonstrative embodiments, the announcement element may include a scheduling field configured to indicate a schedule of one or more subsequent announcement element transmissions, e.g., as described below.

In some demonstrative embodiments, the announcement element may include Time of Departure (ToD) information including at least a ToD of the announcement element, a ToD of the NDP sounding transmission, and/or ToD accuracy, e.g., as described below.

In some demonstrative embodiments, the announcement element may include a channel information field including information corresponding to a wireless channel over which the NDP sounding transmission is to be transmitted, e.g., as described below.

In some demonstrative embodiments, the announcement element may be sent as part of an OFDM broadcast frame, for example, in accordance with an IEEE 802.11 Standard, for example, using any legacy, High Throughput (HT), Very High Throughput (VHT), or High Efficiency (HE) packet format, and/or any other packet format.

In some demonstrative embodiments, the announcement element may include one or more of the following fields, for example, a part of a data field:

TABLE 1

| Name | Description |
| --- | --- |
| Positioning scheduling element | The times and/or periodicity of the announcement transmissions and/or their types. |
| Measurement type | One of the following: Timing, Low-Complexity AoD (LCAoD), High-Complexity AoD (HCAoD) or a combination of one of the AoD techniques with timing measurement. One or more additional or alternative other types may be implemented. |
| Location Configuration Information (LCI) | As defined in the standard as the latitude, longitude, and altitude. Also may include the resolution for each. |
| ToD information | Time of Departure for the announcement and NDP packets, its accuracy and whether it's measured in relation to local time or the time of the synchronized network. This field is optional, for example, if the "Measurement type" field indicates the transmitter only supports AoD methods for this beacon. |
| NDP mapping | A mapping telling the receiver how many preambles are going to be transmitted in the NDP and which are going to be used (for example, as some might be invalid due to switching RF chains between the antennas). If any preambles are used for AGC measurements, this field may indicate it. |
| Environmental statistics | An optional field containing statistics regarding the environmental channel. |

In some demonstrative embodiments, the data fields of Table 1 may be, for example, common to a plurality of different types of location measurement announcement frames.

Figure 4:
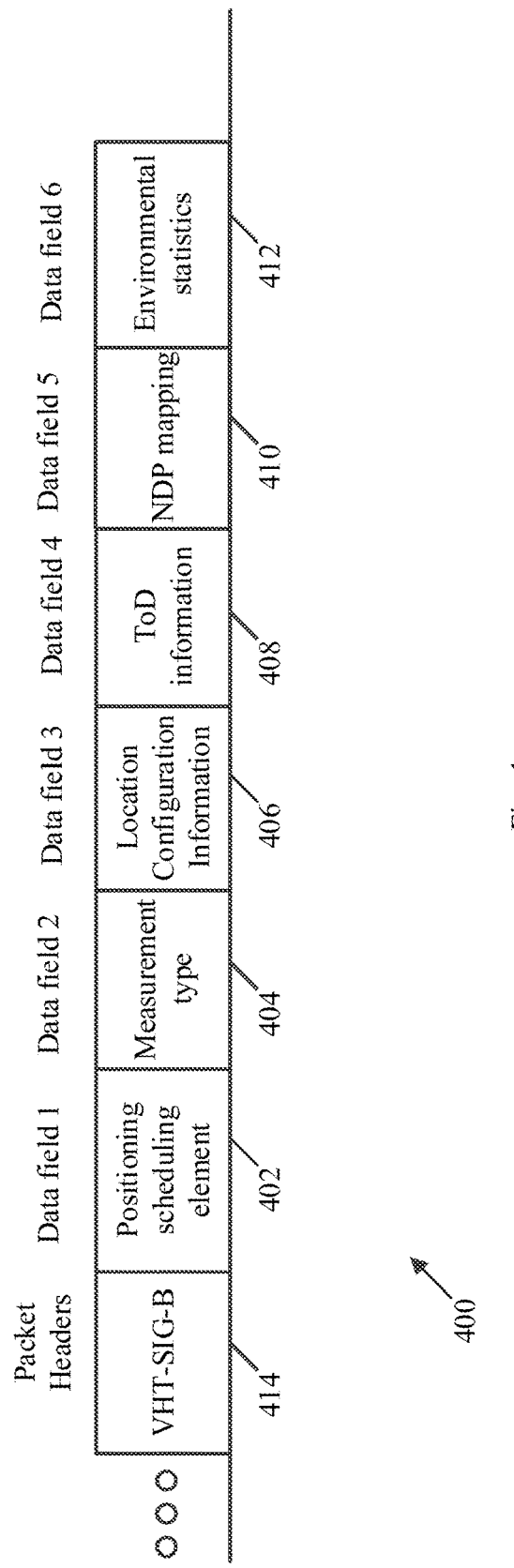
FIG. 4 is a schematic illustration of a structure of an announcement element, in accordance with some demonstrative embodiments.

Reference is made to FIG. 4, which schematically illustrates a structure of an announcement element 400, in accordance with some demonstrative embodiments.

In some demonstrative embodiments, the announcement element 400 may include one or more general fields, which may be used for some or all types of the of the one-sided location measurement.

In some demonstrative embodiments, as shown in FIG. 4, the announcement element 400 may include one or more of the fields of Table 1.

In some demonstrative embodiments, as shown in FIG. 4, the announcement element 400 may include a position scheduling element field 402, e.g., the scheduling field of Table 1, a measurement type field 404, e.g., the measurement type field of Table 1, an optional location configuration information field 406, a ToD information field 408, an NDP mapping field 410, e.g., the NDP mapping field of Table 1, and/or an optional environmental statistic field 412.

In some demonstrative embodiments, as shown in FIG. 4, the announcement packet 400 may include, for example, a header field 414, e.g., a VHT-Signal B (SIG-B) field, e.g., according to a VHT packet format.

In some demonstrative embodiments, the position scheduling element field 402 may be transmitted in a beacon transmission, e.g., in addition to a P-Beacon transmission, for example, to announce the schedule for transmitting the announcement element 400.

Referring back to FIG. 1, in some demonstrative embodiments, the announcement element, e.g., the announcement element 400 (FIG. 4) may include one or more fields, e.g., the configuration fields, for each measurement type, for example, after the general fields, e.g., as described below.

In some demonstrative embodiments, the measurement fields may include data regarding features of a measurement type. One or more of the measurement fields may be different for each type of measurement, and/or one or more of the measurement fields may be optional.

In some demonstrative embodiments, devices 102 and/or 140 may be configured to perform a ranging measurement (also referred to as "a timing measurement").

In some demonstrative embodiments, the one one-sided location measurement may include the ranging measurement.

In some demonstrative embodiments, the announcement element may include one or more configuration fields including one or more fields, which may be configured for the ranging measurement, e.g., as described below.

In some demonstrative embodiments, controller 154 may be configured to control, cause and/or trigger device 140 to include in the announcement element a neighbor list field including information relating to one or more neighbor wireless stations supporting the ranging measurement, for example, when the one-sided location measurement including the ranging measurement, e.g., as described below.

In some demonstrative embodiments, the announcement element may include a precoding field including precoding information corresponding to the plurality of sounding preambles, for example, when the one-sided location measurement including the ranging measurement, e.g., as described below.

In some demonstrative embodiments, controller 154 may be configured to control, cause and/or trigger device 140 to include in the announcement element the precoding field including the precoding information corresponding to the plurality of sounding preambles, for example, when the one-sided location measurement including the ranging measurement, e.g., as described below.

In some demonstrative embodiments, device 102 may receive the announcement element including the neighbor list field and the precoding field form device 140.

In some demonstrative embodiments, controller 124 may be configured to control, cause and/or trigger device 102 to process the neighbor list field of the announcement element, for example, to determine information relating to the one or more neighbor wireless stations supporting the ranging measurement, e.g., when the measurement type field in announcement element is to indicate the one-sided location measurement including a ranging measurement.

In some demonstrative embodiments, controller 124 may be configured to control, cause and/or trigger device 102 to process the precoding field, for example, to precode the plurality of sounding preambles, e.g., when the measurement type field in announcement element is to indicate the one-sided location measurement including a ranging measurement.

In some demonstrative embodiments, controller 124 may be configured to control, cause and/or trigger device 102 to perform the ranging measurement, for example, by processing the NDP sounding transmission, for example, based on the one or more configuration fields configured for the ranging measurement.

In some demonstrative embodiments, the announcement element may include one or more of the following fields, for example, if the announcement element is configured for the ranging measurement:

TABLE 2

| Name | Description |
| --- | --- |
| Neighbor list | List of neighboring stations known to the transmitter, with their timing information, for example, estimated clock offset, ppm offset, and/or change rate in ppm and its accuracy. |
| Precoding data | Optional field that tells the receiver how the preambles are sent - from which antennas and what precoding was used. |

In some demonstrative embodiments, the neighbor list field may include, for example, timing and/or synchronization information of neighboring stations known to the sender of the announcement element.

In some demonstrative embodiments, the neighbor list field may include, for example, timing and/or synchronization information of a wireless station, e.g., the sender of the announcement packet, relative to at least one other station.

In some demonstrative embodiments, the timing and/or synchronization information corresponding to the wireless station may indicate one or more synchronization offsets between a local clock of the wireless station and clocks of one or more neighboring stations.

In some demonstrative embodiments, the one or more synchronization offsets may include a clock offset between the local clock of the wireless station and the clock of the other wireless station, a clock offset accuracy of the clock offset, and/or a last synchronization time between the local clock of the wireless station and the clock of the other wireless stations.

In one example, an announcement element transmitted by a first AP, denoted AP2, may include, for example, timing and/or synchronization information, for example, a timing synchronization table, corresponding to a second AP, denoted AP1, and/or a third AP, denoted AP3, e.g., as follows:

TABLE 3

| MAC | ppm offset | ppm offset accuracy | ppm offset change rate | ppm offset change rate accuracy | Clock offset | Clock offset accuracy | Last synchronization time (local time) |
| --- | --- | --- | --- | --- | --- | --- | --- |
| AP1 | ppm21 | ppmA21 | dppm21 | dppmA21 | co21 | coA21 | tlast21 |
| AP3 | ppm23 | ppmA23 | dppm23 | dppmA23 | co23 | coA23 | tlast23 |

In other embodiments, the timing information may include any additional or alternative information, and/or may have any other format.

In some demonstrative embodiments, the ToD information field of Table 1 may be mandatory for the ranging measurement. In other embodiments, the ToD information field may be omitted and/or replaced by alternative information.

In some demonstrative embodiments, devices 102 and 140 may be configured to perform an AoD measurement.

In some demonstrative embodiments, the one one-sided location measurement may include the AoD measurement.

In some demonstrative embodiments, the announcement element may include one or more configuration fields including one or more fields, which may be configured for the AoD measurement, e.g., as described below.

In some demonstrative embodiments, controller 154 may be configured to control, cause and/or trigger device 140 to include in the announcement element a tone to angle mapping field, for example, to indicate a mapping between a plurality of AoDs and a plurality of tones of the NDP sounding transmission, e.g., when the one-sided location measurement including the AoD measurement.

In some demonstrative embodiments, controller 154 may be configured to control, cause and/or trigger device 140 to include in the announcement element a preamble to antenna mapping field, for example, to indicate a mapping between a plurality of antennas and the plurality of sounding preambles, e.g., when the one-sided location measurement including the AoD measurement.

In some demonstrative embodiments, controller 154 may be configured to control, cause and/or trigger device 140 to include in the announcement element a calibration field including information to calibrate measurements on the NDP sounding transmission, e.g., when the one-sided location measurement including the AoD measurement.

In some demonstrative embodiments, device 102 may receive the announcement element including the tone to angle mapping field, the calibration field, and/or the preamble to antenna mapping field from device 140.

In some demonstrative embodiments, controller 124 may be configured to control, cause and/or trigger device 102 to process the tone to angle mapping field in the announcement element to determine a mapping between the plurality of AoDs and the plurality of tones of the NDP sounding transmission, e.g., when the measurement type field in the announcement element is to indicate the one-sided location measurement including the AoD measurement.

In some demonstrative embodiments, controller 124 may be configured to control, cause and/or trigger device 102 to process the preamble to antenna mapping field in the announcement element to determine a mapping between the plurality of antennas and the plurality of sounding preambles, e.g., when the measurement type field in the announcement element is to indicate the one-sided location measurement including the AoD measurement.

In some demonstrative embodiments, controller 124 may be configured to control, cause and/or trigger device 102 to process the calibration field in the announcement element to determine information to calibrate measurements on the NDP sounding transmission, e.g., when the measurement type field in the announcement element is to indicate the one-sided location measurement including the AoD measurement.

In some demonstrative embodiments, controller 124 may be configured to control, cause and/or trigger device 102 to perform the AoD measurement, for example, by processing the NDP sounding transmission, for example, based on the one or more configuration fields configured for the AoD measurement of the announcement element.

In some demonstrative embodiments, devices 102 and 140 may be configured to perform a firs AoD measurement, e.g., a Low-Complexity-AoD (LCAoD) measurement.

In some demonstrative embodiments, the first AoD measurement may include an AoD measurement according to a scheme, e.g., a simple scheme, which may have reduced complexity for a receiver, e.g., receiver 116, to estimate the AoD from the device 140.

In some demonstrative embodiments, according to the first AoD measurement scheme, a transmitter, e.g., device 140, may send each tone at a specific physical angle, and the receiver, e.g., device 102, may estimate the AoD by associating each received tone to an angle, from which the tone was transmitted.

In some demonstrative embodiments, the announcement element may include one or more configuration fields, which may be configured for the first AoD measurement, e.g., as described below.

In some demonstrative embodiments, the announcement element may include one or more of the following fields, which may be configured for the first AoD measurement:

TABLE 4

| Name | Description |
|---|---|
| Tone to angle mapping | A mapping of tones in each preamble to physical angles to which they are transmitted. |
| Preamble to antenna mapping | Which preamble is sent from which antenna (optional field). |
| Calibration data | Optional field containing the expected power or signal in each tone for each physical angle of the receiver. Can also include the transmitted signals themselves and the structure of the transmitter's antenna array. |

Figure 5:
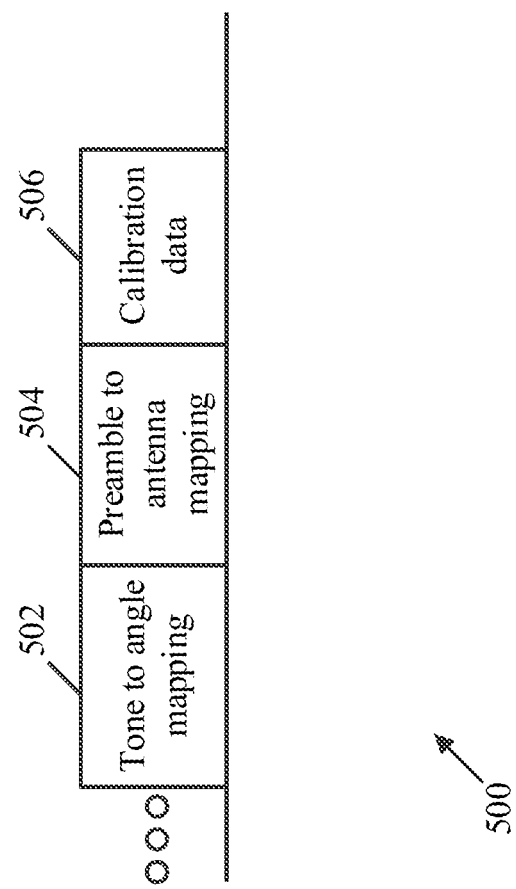
FIG. 5 is a schematic illustration of a structure of an announcement element configured for a first Angle of Departure (AoD) measurement, in accordance with some demonstrative embodiments.

Reference is made to FIG. 5, which schematically illustrates a structure of an announcement element 500 configured for a first AoD measurement, e.g., an LCAoD measurement, in accordance with some demonstrative embodiments.

In some demonstrative embodiments, the announcement element 500 may include configuration fields, which may support the first AoD measurement.

In some demonstrative embodiments, as shown in FIG. 5, the announcement element 500 may include one or more, e.g., all, of the fields of Table 4.

In some demonstrative embodiments, as shown in FIG. 5, the announcement element 500 may include a tone to angle mapping field 502, e.g., the tone to angle mapping field of Table 4, an optional preamble to antenna mapping field 504, e.g., the preamble to antenna mapping field of Table 4, and/or a calibration data field 506, e.g., the calibration field of Table 4.

In some demonstrative embodiments, device 140 (FIG. 1) may transmit the announcement element including announcement element 500, for example, to announce an LCAoD measurement.

Referring back to FIG. 1, in some demonstrative embodiments, devices 102 and 140 may be configured to perform a second AoD measurement, e.g., a High-Complexity-AoD (HCAoD) measurement.

In some demonstrative embodiments, the second AoD measurement may include an AoD measurement in which a transmitter, e.g., device 140, transmits a single preamble from each antenna, for example, while a receiver, e.g., device 102, buffers the preambles. The receiver may be configured to estimate the channel from each transmitting antenna, and to use this channel for estimating an AoD. This method may be more computationally complex for the receiver, e.g., compared to the LCAoD measurement.

In some demonstrative embodiments, the announcement element may include one or more configuration fields, which may be configured for the second AoD measurement, e.g., as described below.

In some demonstrative embodiments, the announcement element may include one or more of the following fields, which may be configured for the HCAoD measurement:

TABLE 5

| Name | Description |
|---|---|
| Preamble to antenna mapping | Which preamble is sent from which antenna. |
| Calibration data | The number and structure of the transmitting antenna array, the phase and amplitude response of the antennas in each physical angle for each tone. |

Figure 6:
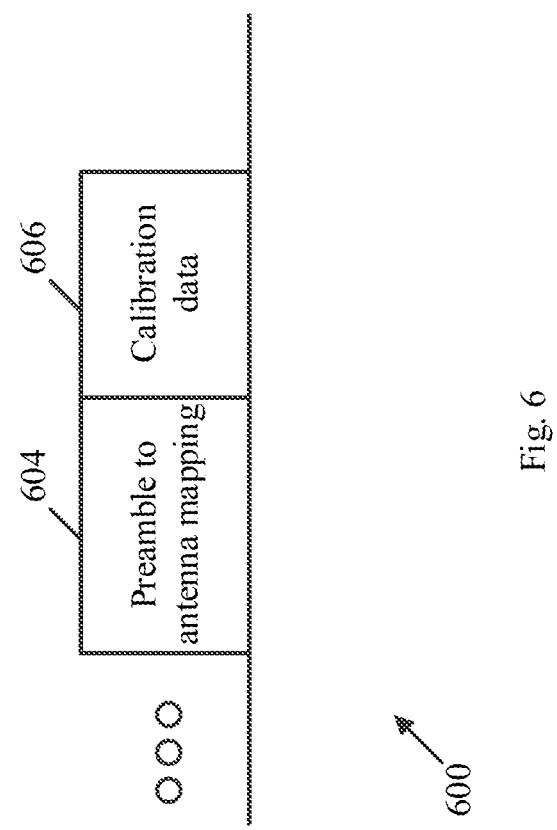
FIG. 6 is a schematic illustration of a structure of an announcement element configured for a second AoD measurement, in accordance with some demonstrative embodiments.

Reference is made to FIG. 6, which schematically illustrates a structure of an announcement packet 600 configured for an HCAoD measurement, in accordance with some demonstrative embodiments.

In some demonstrative embodiments, the announcement element 600 may include configuration fields, which may be used for the second AoD measurement, e.g., the HCAoD measurement.

In some demonstrative embodiments, as shown in FIG. 6, the announcement element 600 may include one or more, e.g., all, of the fields of Table 5.

In some demonstrative embodiments, as shown in FIG. 6, the announcement packet 600 may include a preamble to antenna mapping field 604, e.g., the preamble to antenna mapping field of Table 5, and/or a calibration data field 606, e.g., the calibration field of Table 5.

In some demonstrative embodiments, device 140 (FIG. 1) may transmit the announcement element including announcement element 600, for example, to announce an HCAoD measurement.

Referring back to FIG. 1, in some demonstrative embodiments, devices 102 and/or 140 may be configured to perform a combined measurement, e.g., including a combination of the ranging and the AoD measurements.

In some demonstrative embodiments, the one one-sided location measurement may include the combined measurement.

In some demonstrative embodiments, the announcement element may include one or more configuration fields including one or more fields, which may be configured for the combined measurement, e.g., as described below.

In some demonstrative embodiments, controller 154 may be configured to control, cause and/or trigger device 140 to include in the announcement element the general fields, e.g., e.g., the general fields of announcement element 400 (FIG. 4), the configuration fields configured for the ranging measurement, e.g., the configuration fields in Table 2, and/or the configuration fields configured for the AoD measurement, for example, the first AoD measurement or the second AoD measurement, e.g., the configuration fields of announcement element 500 (FIG. 5), or announcement element 600 (FIG. 6).

In some demonstrative embodiments, the NDP sounding transmission, e.g., from device 140, may be configured to support the AoD measurement, the ranging measurement, and/or the combined measurement, e.g., both the AoD measurement and the ranging measurement, which may be performed by device 102, e.g., using the NDP sounding transmission.

In some demonstrative embodiments, a conventional or a "normal" NDP transmission may be used, for example, to support the ranging measurement.

In some demonstrative embodiments, preambles of the NDP may use a special precoding, for example, as described by US Patent Application Publication US 2014/0185709, entitled "TRANSMITTER PRECODING FOR OPTIMIZING POSITIONING PERFORMANCE", published Jul. 3, 2014, or any other precoding, for example, instead of a conventional Hadamard precoding, which may be used in accordance with an IEEE 802.11 Specification and/or any other Specification for data channel estimation, for example, for the ranging measurement.

In some demonstrative embodiments, for the LCAoD measurement, preambles of the NDP may be sent according to a method configured to support estimation of the AoD according to the tones. The NDP preamble may be configured, for example, according to the data in the configuration fields of the announcement element.

In some demonstrative embodiments, for the HCAoD measurement, preambles of the NDP may be sent each one from a different antenna, for example, according to the data in the configuration fields of the announcement element.

In some demonstrative embodiments, for the combined measurement, the NDP may include the NDP corresponding to a relevant AoD method, e.g., the HCAoD measurement or the LCAoD measurement or any other AoD measurement, followed by extra preambles at the end. The extra preambles may be used, for example, for the ranging measurement.

In some demonstrative embodiments, a symbol for automatic gain control (AGC) by the receiver may be transmitted, for example, between at least some of the preambles of the NDP.

In some demonstrative embodiments, the NDP sounding transmission may enable device 102 to perform ranging and/or AoD measurements, for example, without requiring to transmit back to device 140.

In some demonstrative embodiments, device 102 may be configured to ignore any unnecessary data in the announcement element and/or the NDP transmission, e.g., if device 102 needs data only for the AoD measurement or the ranging measurement.

In some demonstrative embodiments, device 102 may be configured to defer transmissions, for example, during processing of the announcement elements and/or the NDP sounding transmission.

Figure 7:
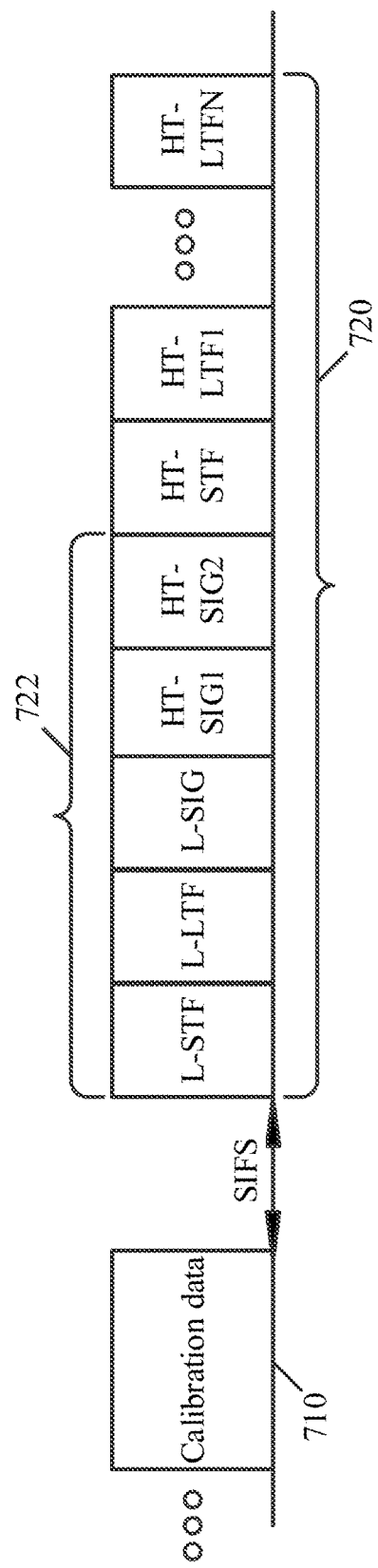
FIG. 7 is a schematic illustration of a structure of an NDP sounding transmission, in accordance with some demonstrative embodiments.

Reference is made to FIG. 7, which schematically illustrates a structure of an NDP sounding transmission 720, in accordance with some demonstrative embodiments.

In some demonstrative embodiments, as shown in FIG. 7, NDP 720 may be transmitted subsequent to an announcement packet 710.

In some demonstrative embodiments, as shown in FIG. 7, NDP 720 may be separated from the announcement packet 710, e.g., by a SIFS.

In some demonstrative embodiments, an AP or a responder, e.g., device 140 (FIG. 1), may transmit announcement packet 710, and may transmit the NDP 720 subsequent to the announcement packet 710.

In some demonstrative embodiments, as shown in FIG. 7, NDP 720 may include one or more header fields 722, followed by a plurality of sounding preambles, e.g., including HT Shot training fields (STFs) and/or HT Long Training Fields LTFs).

Figure 8:
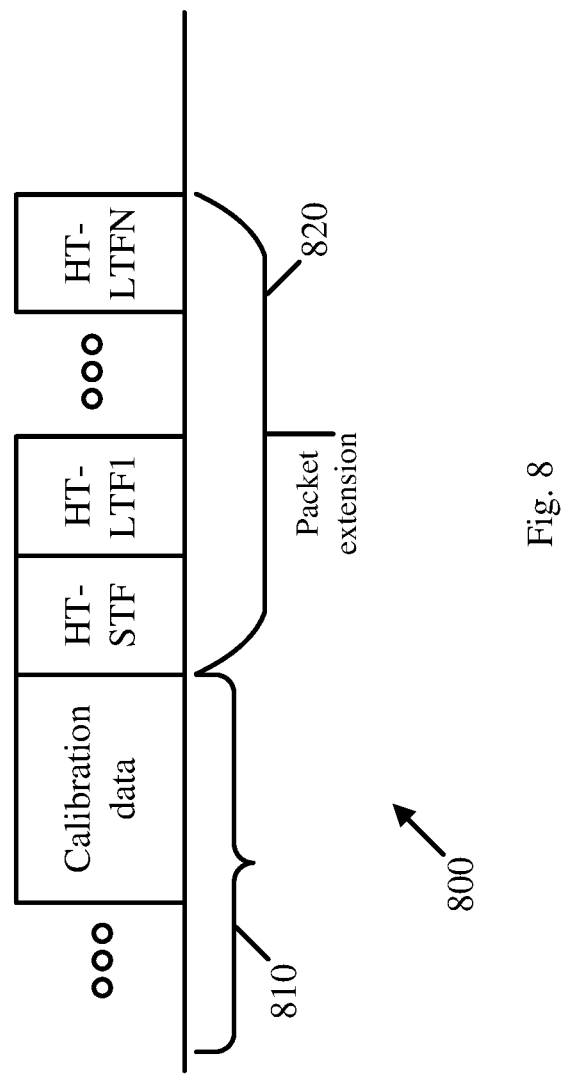
FIG. 8 is a schematic illustration of a structure of a packet including an announcement frame and an NDP sounding transmission, in accordance with some demonstrative embodiments.

Reference is made to FIG. 8, which schematically illustrates a structure of a packet 800 including an announcement element 810 and an NDP sounding transmission 820, in accordance with some demonstrative embodiments.

In some demonstrative embodiments, as shown in FIG. 8, packet 800 may include the announcement element 810, and the NDP sounding transmission 820 subsequent to the announcement element 810, e.g., as a packet extension to the announcement element 810.

In some demonstrative embodiments, as shown in FIG. 8, NDP sounding transmission 820 may not include header fields, e.g., header fields 722 (FIG. 7), for example, since NDP sounding transmission 820 is a packet extension of announcement element 810. For example, as shown in FIG. 8 the sounding preambles may follow the announcement element 810, e.g., the sounding preambles may be immediately subsequent to the announcement element 810.

Figure 9:
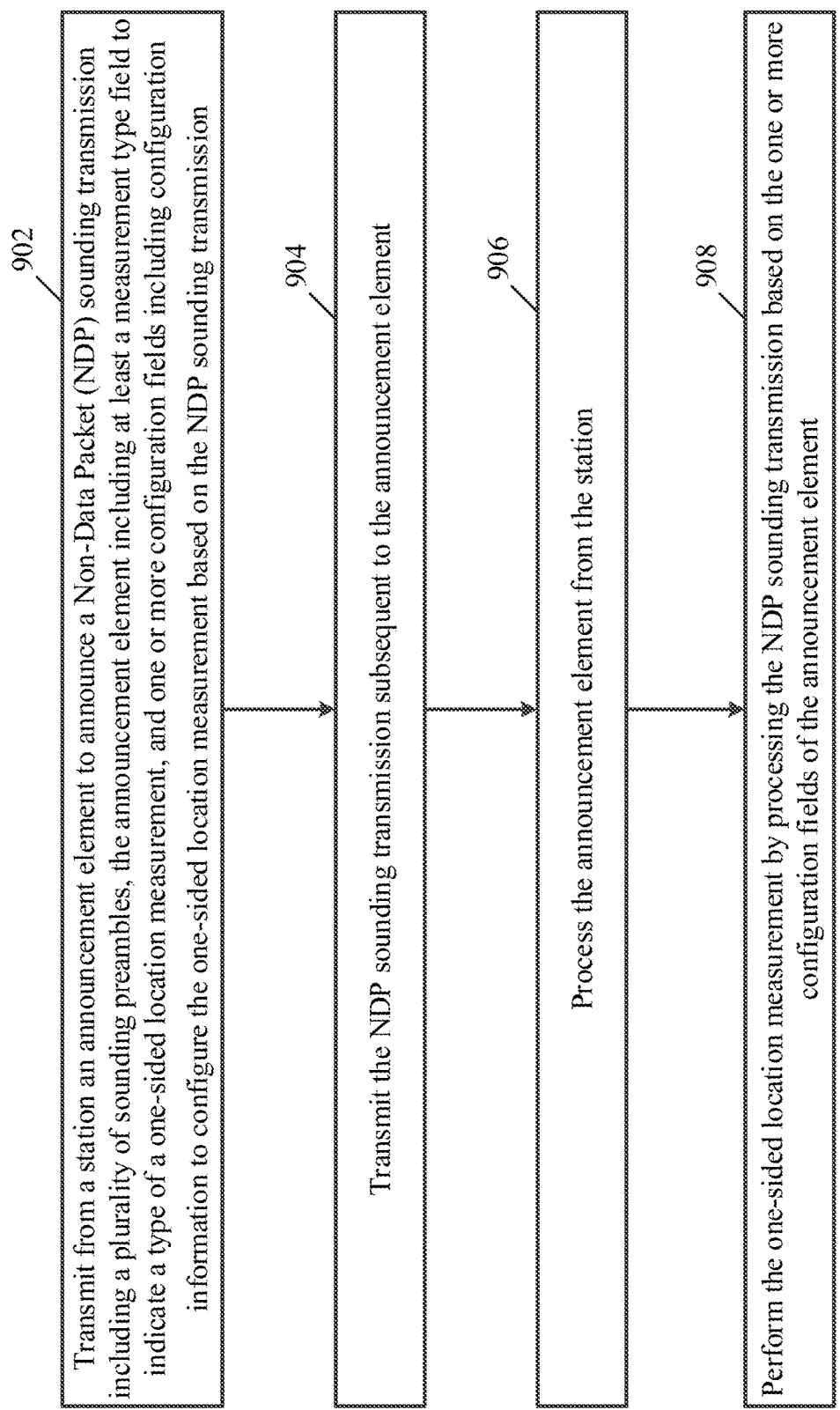
FIG. 9 is a schematic flow-chart illustration of a method of a one-sided location measurement, in accordance with some demonstrative embodiments.

Reference is made to FIG. 9, which schematically illustrates a method of one-sided location measurement, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1) and/or device 140 (FIG. 1); a controller, e.g., controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, and/or receiver 146 (FIG. 1); a location estimator, e.g., location estimator 115 (FIG. 1); and/or a message processor, e.g., message processor 128 (FIG. 1) and/or message processor 158 (FIG. 1).

As indicated at block 902, the method may include transmitting from a first station an announcement element to announce a NDP sounding transmission including a plurality of sounding preambles, the announcement element including at least a measurement type field to indicate a type of a one-sided location measurement, and one or more configuration fields may include configuration information to configure the one-sided location measurement based on the NDP sounding transmission. For example, device 140 (FIG. 1) may transmit the announcement element including the measurement type field and the one or more configuration fields, for example, including one or more fields of Table 1, 2, 3, 4, and/or 5, e.g., as described above.

As indicated at block 904, the method may include transmitting the NDP sounding transmission subsequent to the announcement element. For example, device 140 (FIG. 1) may transmit the NDP sounding transmission subsequent to the announcement element, e.g., as described above.

As indicated at block 906, the method may include processing the announcement element from the first station at a second station. For example, device 102 (FIG. 1) may process the announcement element from device 140 (FIG. 1), e.g., as described above.

As indicated at block 908, the method may include performing the one-sided location measurement by processing the NDP sounding transmission based on the one or more configuration fields of the announcement element. For example, device 102 (FIG. 1) may perform the one-sided location measurement by processing the NDP sounding transmission from device 140 (FIG. 1), for example, based on the one or more configuration fields of the announcement element from device 140 (FIG. 1), e.g., as described above.

Figure 10:
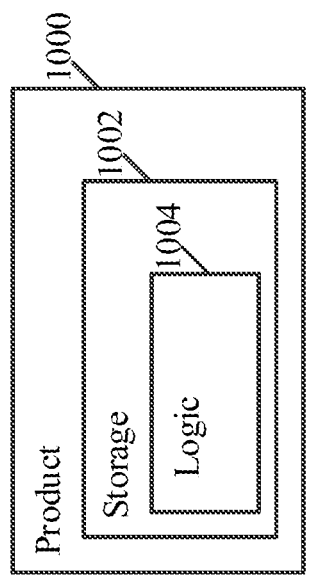
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable non-transitory storage media 1002, which may include computer-executable instructions, e.g., implemented by logic 1004, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124 and/or 154 (FIG. 1), location estimator 115 (FIG. 1), message processors 128 and/or 158 (FIG. 1), and/or to perform one or more operations described above with respect to FIGS. 1, 2, 3, 4, 5, 6, 7, 8, and/or 9, and/or one or more operations described herein. The phrase "non-transitory machine-readable medium" is directed to include all computer-readable media, with the sole exception being a transitory propagating signal.

In some demonstrative embodiments, product 1000 and/or storage media 1002 may include one or more types of computer-readable storage media capable of storing data, including volatile memory, non-volatile memory, removable or non-removable memory, erasable or non-erasable memory, writeable or re-writeable memory, and the like. For example, storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to cause a wireless station to transmit an announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission; and transmit the NDP sounding transmission subsequent to the announcement element.

Example 2 includes the subject matter of Example 1, and optionally, wherein the apparatus is configured to cause the wireless station to transmit a packet comprising the announcement element, the packet comprising the NDP sounding transmission subsequent to the announcement element.

Example 3 includes the subject matter of Example 1, and optionally, wherein the apparatus is configured to cause the wireless station to transmit an announcement packet comprising the announcement element, and, subsequent to the announcement packet, to transmit an NDP comprising the NDP sounding transmission.

Example 4 includes the subject matter of Example 3, and optionally, wherein the NDP is separated from the announcement packet by a Short Inter-Frame Space (SIFS).

Example 5 includes the subject matter of any one of Examples 1-4, and optionally, wherein the type of the one-sided location measurement comprises a ranging measurement, an Angle of Departure (AoD) measurement, or a combination of the ranging and AoD measurements.

Example 6 includes the subject matter of any one of Examples 1-5, and optionally, wherein the apparatus is configured to cause the wireless station to, when the one-sided location measurement comprises a ranging measurement, include in the announcement element at least a neighbor list field comprising information relating to one or more neighbor wireless stations supporting the ranging measurement.

Example 7 includes the subject matter of Example 6, and optionally, wherein the announcement element comprises at least a precoding field comprising precoding information corresponding to the plurality of sounding preambles.

Example 8 includes the subject matter of any one of Examples 1-7, and optionally, wherein the apparatus is configured to cause the wireless station to, when the one-sided location measurement comprises an Angle of Departure (AoD) measurement, include in the announcement element at least a tone to angle mapping field to indicate a mapping between a plurality of AoDs and a plurality of tones of the NDP sounding transmission.

Example 9 includes the subject matter of any one of Examples 1-8, and optionally, wherein the apparatus is configured to cause the wireless station to, when the one-sided location measurement comprises an Angle of Departure (AoD) measurement, include in the announcement element at least a preamble to antenna mapping field to indicate a mapping between a plurality of antennas and the plurality of sounding preambles.

Example 10 includes the subject matter of any one of Examples 1-9, and optionally, wherein the apparatus is configured to cause the wireless station to, when the one-sided location measurement comprises an Angle of Departure (AoD) measurement, include in the announcement element at least a calibration field comprising information to calibrate measurements on the NDP sounding transmission.

Example 11 includes the subject matter of any one of Examples 1-10, and optionally, wherein the announcement element comprises at least an NDP mapping field to indicate a count of the plurality of sounding preambles, and which sounding preambles are to be used for the one-sided location measurement.

Example 12 includes the subject matter of any one of Examples 1-11, and optionally, wherein the announcement element comprises at least a scheduling field to indicate a schedule of one or more subsequent announcement element transmissions.

Example 13 includes the subject matter of any one of Examples 1-12, and optionally, wherein the announcement element comprises at least a Time of Departure (ToD) information field comprising at least a ToD of the announcement element, a ToD of the NDP sounding transmission, and a ToD accuracy.

Example 14 includes the subject matter of any one of Examples 1-13, and optionally, wherein the announcement element comprises at least a channel information field comprising information corresponding to a wireless channel over which the NDP sounding transmission is to be transmitted.

Example 15 includes the subject matter of any one of Examples 1-14, and optionally, wherein the apparatus is configured to cause the wireless station to transmit the announcement element as part of a beacon.

Example 16 includes the subject matter of any one of Examples 1-15, and optionally, comprising an Access Point (AP).

Example 17 includes the subject matter of any one of Examples 1-16, and optionally, comprising a radio, one or more antennas, a memory and a processor.

Example 18 includes a system of wireless communication comprising a wireless station, the wireless station comprising one or more antennas; a radio; a memory; a processor; and a controller configured to cause the wireless station to transmit an announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission; and transmit the NDP sounding transmission subsequent to the announcement element.

Example 19 includes the subject matter of Example 18, and optionally, wherein the controller is configured to cause the wireless station to transmit a packet comprising the announcement element, the packet comprising the NDP sounding transmission subsequent to the announcement element.

Example 20 includes the subject matter of Example 18, and optionally, wherein the controller is configured to cause the wireless station to transmit an announcement packet comprising the announcement element, and, subsequent to the announcement packet, to transmit an NDP comprising the NDP sounding transmission.

Example 21 includes the subject matter of Example 20, and optionally, wherein the NDP is separated from the announcement packet by a Short Inter-Frame Space (SIFS).

Example 22 includes the subject matter of any one of Examples 18-21, and optionally, wherein the type of the one-sided location measurement comprises a ranging measurement, an Angle of Departure (AoD) measurement, or a combination of the ranging and AoD measurements.

Example 23 includes the subject matter of any one of Examples 18-22, and optionally, wherein the controller is configured to cause the wireless station to, when the one-sided location measurement comprises a ranging measurement, include in the announcement element at least a neighbor list field comprising information relating to one or more neighbor wireless stations supporting the ranging measurement.

Example 24 includes the subject matter of Example 23, and optionally, wherein the announcement element comprises at least a precoding field comprising precoding information corresponding to the plurality of sounding preambles.

Example 25 includes the subject matter of any one of Examples 18-24, and optionally, wherein the controller is configured to cause the wireless station to, when the one-sided location measurement comprises an Angle of Departure (AoD) measurement, include in the announcement element at least a tone to angle mapping field to indicate a mapping between a plurality of AoDs and a plurality of tones of the NDP sounding transmission.

Example 26 includes the subject matter of any one of Examples 18-25, and optionally, wherein the controller is configured to cause the wireless station to, when the one-sided location measurement comprises an Angle of Departure (AoD) measurement, include in the announcement element at least a preamble to antenna mapping field to indicate a mapping between a plurality of antennas and the plurality of sounding preambles.

Example 27 includes the subject matter of any one of Examples 18-26, and optionally, wherein the controller is configured to cause the wireless station to, when the one-sided location measurement comprises an Angle of Departure (AoD) measurement, include in the announcement element at least a calibration field comprising information to calibrate measurements on the NDP sounding transmission.

Example 28 includes the subject matter of any one of Examples 18-27, and optionally, wherein the announcement element comprises at least an NDP mapping field to indicate a count of the plurality of sounding preambles, and which sounding preambles are to be used for the one-sided location measurement.

Example 29 includes the subject matter of any one of Examples 18-28, and optionally, wherein the announcement element comprises at least a scheduling field to indicate a schedule of one or more subsequent announcement element transmissions.

Example 30 includes the subject matter of any one of Examples 18-29, and optionally, wherein the announcement element comprises at least a Time of Departure (ToD) information field comprising at least a ToD of the announcement element, a ToD of the NDP sounding transmission, and a ToD accuracy.

Example 31 includes the subject matter of any one of Examples 18-30, and optionally, wherein the announcement element comprises at least a channel information field comprising information corresponding to a wireless channel over which the NDP sounding transmission is to be transmitted.

Example 32 includes the subject matter of any one of Examples 18-31, and optionally, wherein the controller is configured to cause the wireless station to transmit the announcement element as part of a beacon.

Example 33 includes the subject matter of any one of Examples 18-32, and optionally, wherein the wireless station comprises an Access Point (AP).

Example 34 includes a method to be performed at a wireless station, the method comprising transmitting an announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission; and transmitting the NDP sounding transmission subsequent to the announcement element.

Example 35 includes the subject matter of Example 34, and optionally, comprising transmitting a packet comprising the announcement element, the packet comprising the NDP sounding transmission subsequent to the announcement element.

Example 36 includes the subject matter of Example 34, and optionally, comprising transmitting an announcement packet comprising the announcement element, and, subsequent to the announcement packet, transmitting an NDP comprising the NDP sounding transmission.

Example 37 includes the subject matter of Example 36, and optionally, wherein the NDP is separated from the announcement packet by a Short Inter-Frame Space (SIFS).

Example 38 includes the subject matter of any one of Examples 34-37, and optionally, wherein the type of the one-sided location measurement comprises a ranging measurement, an Angle of Departure (AoD) measurement, or a combination of the ranging and AoD measurements.

Example 39 includes the subject matter of any one of Examples 34-38, and optionally, comprising, when the one-sided location measurement comprises a ranging measurement, including in the announcement element at least a neighbor list field comprising information relating to one or more neighbor wireless stations supporting the ranging measurement.

Example 40 includes the subject matter of Example 39, and optionally, wherein the announcement element comprises at least a precoding field comprising precoding information corresponding to the plurality of sounding preambles.

Example 41 includes the subject matter of any one of Examples 34-40, and optionally, comprising, when the one-sided location measurement comprises an Angle of Departure (AoD) measurement, including in the announcement element at least a tone to angle mapping field to indicate a mapping between a plurality of AoDs and a plurality of tones of the NDP sounding transmission.

Example 42 includes the subject matter of any one of Examples 34-41, and optionally, comprising, when the one-sided location measurement comprises an Angle of Departure (AoD) measurement, including in the announcement element at least a preamble to antenna mapping field to indicate a mapping between a plurality of antennas and the plurality of sounding preambles.

Example 43 includes the subject matter of any one of Examples 34-42, and optionally, comprising, when the one-sided location measurement comprises an Angle of Departure (AoD) measurement, including in the announcement element at least a calibration field comprising information to calibrate measurements on the NDP sounding transmission.

Example 44 includes the subject matter of any one of Examples 34-43, and optionally, wherein the announcement element comprises at least an NDP mapping field to indicate a count of the plurality of sounding preambles, and which sounding preambles are to be used for the one-sided location measurement.

Example 45 includes the subject matter of any one of Examples 34-44, and optionally, wherein the announcement element comprises at least a scheduling field to indicate a schedule of one or more subsequent announcement element transmissions.

Example 46 includes the subject matter of any one of Examples 34-45, and optionally, wherein the announcement element comprises at least a Time of Departure (ToD) information field comprising at least a ToD of the announcement element, a ToD of the NDP sounding transmission, and a ToD accuracy.

Example 47 includes the subject matter of any one of Examples 34-46, and optionally, wherein the announcement element comprises at least a channel information field comprising information corresponding to a wireless channel over which the NDP sounding transmission is to be transmitted.

Example 48 includes the subject matter of any one of Examples 34-47, and optionally, comprising transmitting the announcement element as part of a beacon.

Example 49 includes the subject matter of any one of Examples 34-48, and optionally, wherein the wireless station comprises an Access Point (AP).

Example 50 includes a product including one or more tangible computer-readable non-transitory storage media comprising computer-executable instructions operable to, when executed by at least one computer processor, enable the at least one computer processor to implement operations at a wireless station, the operations comprising transmitting an announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission; and transmitting the NDP sounding transmission subsequent to the announcement element.

Example 51 includes the subject matter of Example 50, and optionally, wherein the operations comprise transmitting a packet comprising the announcement element, the packet comprising the NDP sounding transmission subsequent to the announcement element.

Example 52 includes the subject matter of Example 50, and optionally, wherein the operations comprise transmitting an announcement packet comprising the announcement element, and, subsequent to the announcement packet, transmitting an NDP comprising the NDP sounding transmission.

Example 53 includes the subject matter of Example 52, and optionally, wherein the NDP is separated from the announcement packet by a Short Inter-Frame Space (SIFS).

Example 54 includes the subject matter of any one of Examples 50-53, and optionally, wherein the type of the one-sided location measurement comprises a ranging measurement, an Angle of Departure (AoD) measurement, or a combination of the ranging and AoD measurements.

Example 55 includes the subject matter of any one of Examples 50-54, and optionally, wherein the operations comprise, when the one-sided location measurement comprises a ranging measurement, including in the announcement element at least a neighbor list field comprising information relating to one or more neighbor wireless stations supporting the ranging measurement.

Example 56 includes the subject matter of Example 55, and optionally, wherein the announcement element comprises at least a precoding field comprising precoding information corresponding to the plurality of sounding preambles.

Example 57 includes the subject matter of any one of Examples 50-56, and optionally, wherein the operations comprise, when the one-sided location measurement comprises an Angle of Departure (AoD) measurement, including in the announcement element at least a tone to angle mapping field to indicate a mapping between a plurality of AoDs and a plurality of tones of the NDP sounding transmission.

Example 58 includes the subject matter of any one of Examples 50-57, and optionally, wherein the operations comprise, when the one-sided location measurement comprises an Angle of Departure (AoD) measurement, including in the announcement element at least a preamble to antenna mapping field to indicate a mapping between a plurality of antennas and the plurality of sounding preambles.

Example 59 includes the subject matter of any one of Examples 50-58, and optionally, wherein the operations comprise, when the one-sided location measurement comprises an Angle of Departure (AoD) measurement, including in the announcement element at least a calibration field comprising information to calibrate measurements on the NDP sounding transmission.

Example 60 includes the subject matter of any one of Examples 50-59, and optionally, wherein the announcement element comprises at least an NDP mapping field to indicate a count of the plurality of sounding preambles, and which sounding preambles are to be used for the one-sided location measurement.

Example 61 includes the subject matter of any one of Examples 50-60, and optionally, wherein the announcement element comprises at least a scheduling field to indicate a schedule of one or more subsequent announcement element transmissions.

Example 62 includes the subject matter of any one of Examples 50-61, and optionally, wherein the announcement element comprises at least a Time of Departure (ToD) information field comprising at least a ToD of the announcement element, a ToD of the NDP sounding transmission, and a ToD accuracy.

Example 63 includes the subject matter of any one of Examples 50-62, and optionally, wherein the announcement element comprises at least a channel information field comprising information corresponding to a wireless channel over which the NDP sounding transmission is to be transmitted.

Example 64 includes the subject matter of any one of Examples 50-63, and optionally, wherein the operations comprise transmitting the announcement element as part of a beacon.

Example 65 includes the subject matter of any one of Examples 50-64, and optionally, wherein the wireless station comprises an Access Point (AP).

Example 66 includes an apparatus of wireless communication by a wireless station, the apparatus comprising means for transmitting an announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission; and means for transmitting the NDP sounding transmission subsequent to the announcement element.

Example 67 includes the subject matter of Example 66, and optionally, comprising means for transmitting a packet comprising the announcement element, the packet comprising the NDP sounding transmission subsequent to the announcement element.

Example 68 includes the subject matter of Example 66, and optionally, comprising means for transmitting an announcement packet comprising the announcement element, and, subsequent to the announcement packet, transmitting an NDP comprising the NDP sounding transmission.

Example 69 includes the subject matter of Example 68, and optionally, wherein the NDP is separated from the announcement packet by a Short Inter-Frame Space (SIFS).

Example 70 includes the subject matter of any one of Examples 66-69, and optionally, wherein the type of the one-sided location measurement comprises a ranging measurement, an Angle of Departure (AoD) measurement, or a combination of the ranging and AoD measurements.

Example 71 includes the subject matter of any one of Examples 66-70, and optionally, comprising means for, when the one-sided location measurement comprises a ranging measurement, including in the announcement element at least a neighbor list field comprising information relating to one or more neighbor wireless stations supporting the ranging measurement.

Example 72 includes the subject matter of Example 71, and optionally, wherein the announcement element comprises at least a precoding field comprising precoding information corresponding to the plurality of sounding preambles.

Example 73 includes the subject matter of any one of Examples 66-72, and optionally, comprising means for, when the one-sided location measurement comprises an Angle of Departure (AoD) measurement, including in the announcement element at least a tone to angle mapping field to indicate a mapping between a plurality of AoDs and a plurality of tones of the NDP sounding transmission.

Example 74 includes the subject matter of any one of Examples 66-73, and optionally, comprising means for, when the one-sided location measurement comprises an Angle of Departure (AoD) measurement, including in the announcement element at least a preamble to antenna mapping field to indicate a mapping between a plurality of antennas and the plurality of sounding preambles.

Example 75 includes the subject matter of any one of Examples 66-74, and optionally, comprising means for, when the one-sided location measurement comprises an Angle of Departure (AoD) measurement, including in the announcement element at least a calibration field comprising information to calibrate measurements on the NDP sounding transmission.

Example 76 includes the subject matter of any one of Examples 66-75, and optionally, wherein the announcement element comprises at least an NDP mapping field to indicate a count of the plurality of sounding preambles, and which sounding preambles are to be used for the one-sided location measurement.

Example 77 includes the subject matter of any one of Examples 66-76, and optionally, wherein the announcement element comprises at least a scheduling field to indicate a schedule of one or more subsequent announcement element transmissions.

Example 78 includes the subject matter of any one of Examples 66-77, and optionally, wherein the announcement element comprises at least a Time of Departure (ToD) information field comprising at least a ToD of the announcement element, a ToD of the NDP sounding transmission, and a ToD accuracy.

Example 79 includes the subject matter of any one of Examples 66-78, and optionally, wherein the announcement element comprises at least a channel information field comprising information corresponding to a wireless channel over which the NDP sounding transmission is to be transmitted.

Example 80 includes the subject matter of any one of Examples 66-79, and optionally, comprising means for transmitting the announcement element as part of a beacon.

Example 81 includes the subject matter of any one of Examples 66-80, and optionally, wherein the wireless station comprises an Access Point (AP).

Example 82 includes an apparatus comprising circuitry and logic configured to cause a first wireless station to process an announcement element from a second wireless station, the announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission; and perform the one-sided location measurement by processing the NDP sounding transmission based on the one or more configuration fields of the announcement element.

Example 83 includes the subject matter of Example 82, and optionally, wherein the apparatus is configured to cause the first wireless station to process a packet comprising the announcement element, the packet comprising the NDP sounding transmission subsequent to the announcement element.

Example 84 includes the subject matter of Example 82, and optionally, wherein the apparatus is configured to cause the first wireless station to process an announcement packet comprising the announcement element from the second wireless station, and, subsequent to the announcement packet, process an NDP comprising the NDP sounding transmission from the second wireless station.

Example 85 includes the subject matter of Example 84, and optionally, wherein the NDP is separated from the announcement packet by a Short Inter-Frame Space (SIFS).

Example 86 includes the subject matter of any one of Examples 82-85, and optionally, wherein the type of the one-sided location measurement comprises a ranging measurement, an Angle of Departure (AoD) measurement, or a combination of the ranging and AoD measurements.

Example 87 includes the subject matter of any one of Examples 82-86, and optionally, wherein the apparatus is configured to cause the first wireless station to, when the measurement type field is to indicate the one-sided location measurement comprises a ranging measurement, process at least a neighbor list field of the announcement element to determine information relating to one or more neighbor wireless stations supporting the ranging measurement.

Example 88 includes the subject matter of Example 87, and optionally, wherein the announcement element comprises at least a precoding field comprising precoding information corresponding to the plurality of sounding preambles.

Example 89 includes the subject matter of any one of Examples 82-88, and optionally, wherein the apparatus is configured to cause the first wireless station to, when the measurement type field is to indicate the one-sided location measurement comprises an Angle of Departure (AoD) measurement, process at least a tone to angle mapping field in the announcement element to determine a mapping between a plurality of AoDs and a plurality of tones of the NDP sounding transmission.

Example 90 includes the subject matter of any one of Examples 82-89, and optionally, wherein the apparatus is configured to cause the first wireless station to, when the measurement type field is to indicate the one-sided location measurement comprises an Angle of Departure (AoD) measurement, process at least a preamble to antenna mapping field in the announcement element to determine a mapping between a plurality of antennas and the plurality of sounding preambles.

Example 91 includes the subject matter of any one of Examples 82-90, and optionally, wherein the apparatus is configured to cause the first wireless station to, when the measurement type field is to indicate the one-sided location measurement comprises an Angle of Departure (AoD) measurement, process at least a calibration field in the announcement element to determine information to calibrate measurements on the NDP sounding transmission.

Example 92 includes the subject matter of any one of Examples 82-91, and optionally, wherein the apparatus is configured to cause the first wireless station to process at least an NDP mapping field in the announcement element to determine a count of the plurality of sounding preambles, and which sounding preambles are to be used for the one-sided location measurement.

Example 93 includes the subject matter of any one of Examples 82-92, and optionally, wherein the apparatus is configured to cause the first wireless station to process at least a scheduling field in the announcement element to determine a schedule of one or more subsequent announcement element transmissions.

Example 94 includes the subject matter of any one of Examples 82-93, and optionally, wherein the apparatus is configured to cause the first wireless station to process at least a Time of Departure (ToD) information field in the announcement element to determine at least a ToD of the announcement element, a ToD of the NDP sounding transmission, and a ToD accuracy.

Example 95 includes the subject matter of any one of Examples 82-94, and optionally, wherein the apparatus is configured to cause the first wireless station to process at least a channel information field in the announcement element to determine information corresponding to a wireless channel over which the NDP sounding transmission is to be received.

Example 96 includes the subject matter of any one of Examples 82-95, and optionally, wherein the apparatus is configured to cause the wireless station to process a beacon comprising the announcement element.

Example 97 includes the subject matter of any one of Examples 82-96, and optionally, comprising a mobile device.

Example 98 includes the subject matter of any one of Examples 82-97, and optionally, comprising a radio, one or more antennas, a memory and a processor.

Example 99 includes a system of wireless communication comprising a first wireless station, the first wireless station comprising one or more antennas; a radio; a memory; a processor; and a controller configured to cause the first wireless station to process an announcement element from a second wireless station, the announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission; and perform the one-sided location measurement by processing the NDP sounding transmission based on the one or more configuration fields of the announcement element.

Example 100 includes the subject matter of Example 99, and optionally, wherein the controller is configured to cause the first wireless station to process a packet comprising the announcement element, the packet comprising the NDP sounding transmission subsequent to the announcement element.

Example 101 includes the subject matter of Example 99, and optionally, wherein the controller is configured to cause the first wireless station to process an announcement packet comprising the announcement element from the second wireless station, and, subsequent to the announcement packet, process an NDP comprising the NDP sounding transmission from the second wireless station.

Example 102 includes the subject matter of Example 101, and optionally, wherein the NDP is separated from the announcement packet by a Short Inter-Frame Space (SIFS).

Example 103 includes the subject matter of any one of Examples 99-102, and optionally, wherein the type of the one-sided location measurement comprises a ranging measurement, an Angle of Departure (AoD) measurement, or a combination of the ranging and AoD measurements.

Example 104 includes the subject matter of any one of Examples 99-103, and optionally, wherein the controller is configured to cause the first wireless station to, when the measurement type field is to indicate the one-sided location measurement comprises a ranging measurement, process at least a neighbor list field of the announcement element to determine information relating to one or more neighbor wireless stations supporting the ranging measurement.

Example 105 includes the subject matter of Example 104, and optionally, wherein the announcement element comprises at least a precoding field comprising precoding information corresponding to the plurality of sounding preambles.

Example 106 includes the subject matter of any one of Examples 99-105, and optionally, wherein the controller is configured to cause the first wireless station to, when the measurement type field is to indicate the one-sided location measurement comprises an Angle of Departure (AoD) measurement, process at least a tone to angle mapping field in the announcement element to determine a mapping between a plurality of AoDs and a plurality of tones of the NDP sounding transmission.

Example 107 includes the subject matter of any one of Examples 99-106, and optionally, wherein the controller is configured to cause the first wireless station to, when the measurement type field is to indicate the one-sided location measurement comprises an Angle of Departure (AoD) measurement, process at least a preamble to antenna mapping field in the announcement element to determine a mapping between a plurality of antennas and the plurality of sounding preambles.

Example 108 includes the subject matter of any one of Examples 99-107, and optionally, wherein the controller is configured to cause the first wireless station to, when the measurement type field is to indicate the one-sided location measurement comprises an Angle of Departure (AoD) measurement, process at least a calibration field in the announcement element to determine information to calibrate measurements on the NDP sounding transmission.

Example 109 includes the subject matter of any one of Examples 99-108, and optionally, wherein the controller is configured to cause the first wireless station to process at least an NDP mapping field in the announcement element to determine a count of the plurality of sounding preambles, and which sounding preambles are to be used for the one-sided location measurement.

Example 110 includes the subject matter of any one of Examples 99-109, and optionally, wherein the controller is configured to cause the first wireless station to process at least a scheduling field in the announcement element to determine a schedule of one or more subsequent announcement element transmissions.

Example 111 includes the subject matter of any one of Examples 99-110, and optionally, wherein the controller is configured to cause the first wireless station to process at least a Time of Departure (ToD) information field in the announcement element to determine at least a ToD of the announcement element, a ToD of the NDP sounding transmission, and a ToD accuracy.

Example 112 includes the subject matter of any one of Examples 99-111, and optionally, wherein the controller is configured to cause the first wireless station to process at least a channel information field in the announcement element to determine information corresponding to a wireless channel over which the NDP sounding transmission is to be received.

Example 113 includes the subject matter of any one of Examples 99-112, and optionally, wherein the controller is configured to cause the wireless station to process a beacon comprising the announcement element.

Example 114 includes the subject matter of any one of Examples 99-113, and optionally, wherein the first wireless station comprises a mobile device.

Example 115 includes a method to be performed at a first wireless station, the method comprising processing an announcement element from a second wireless station, the announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission; and performing the one-sided location measurement by processing the NDP sounding transmission based on the one or more configuration fields of the announcement element.

Example 116 includes the subject matter of Example 115, and optionally, comprising processing a packet comprising the announcement element, the packet comprising the NDP sounding transmission subsequent to the announcement element.

Example 117 includes the subject matter of Example 115, and optionally, comprising processing an announcement packet comprising the announcement element from the second wireless station, and, subsequent to the announcement packet, processing an NDP comprising the NDP sounding transmission from the second wireless station.

Example 118 includes the subject matter of Example 117, and optionally, wherein the NDP is separated from the announcement packet by a Short Inter-Frame Space (SIFS).

Example 119 includes the subject matter of any one of Examples 115-118, and optionally, wherein the type of the one-sided location measurement comprises a ranging measurement, an Angle of Departure (AoD) measurement, or a combination of the ranging and AoD measurements.

Example 120 includes the subject matter of any one of Examples 115-119, and optionally, comprising, when the measurement type field is to indicate the one-sided location measurement comprises a ranging measurement, processing at least a neighbor list field of the announcement element to determine information relating to one or more neighbor wireless stations supporting the ranging measurement.

Example 121 includes the subject matter of Example 120, and optionally, wherein the announcement element comprises at least a precoding field comprising precoding information corresponding to the plurality of sounding preambles.

Example 122 includes the subject matter of any one of Examples 115-121, and optionally, comprising, when the measurement type field is to indicate the one-sided location measurement comprises an Angle of Departure (AoD) measurement, processing at least a tone to angle mapping field in the announcement element to determine a mapping between a plurality of AoDs and a plurality of tones of the NDP sounding transmission.

Example 123 includes the subject matter of any one of Examples 115-122, and optionally, comprising, when the measurement type field is to indicate the one-sided location measurement comprises an Angle of Departure (AoD) measurement, processing at least a preamble to antenna mapping field in the announcement element to determine a mapping between a plurality of antennas and the plurality of sounding preambles.

Example 124 includes the subject matter of any one of Examples 115-123, and optionally, comprising, when the measurement type field is to indicate the one-sided location measurement comprises an Angle of Departure (AoD) measurement, processing at least a calibration field in the announcement element to determine information to calibrate measurements on the NDP sounding transmission.

Example 125 includes the subject matter of any one of Examples 115-124, and optionally, comprising processing at least an NDP mapping field in the announcement element to determine a count of the plurality of sounding preambles, and which sounding preambles are to be used for the one-sided location measurement.

Example 126 includes the subject matter of any one of Examples 115-125, and optionally, comprising processing at least a scheduling field in the announcement element to determine a schedule of one or more subsequent announcement element transmissions.

Example 127 includes the subject matter of any one of Examples 115-126, and optionally, comprising processing at least a Time of Departure (ToD) information field in the announcement element to determine at least a ToD of the announcement element, a ToD of the NDP sounding transmission, and a ToD accuracy.

Example 128 includes the subject matter of any one of Examples 115-127, and optionally, comprising processing at least a channel information field in the announcement element to determine information corresponding to a wireless channel over which the NDP sounding transmission is to be received.

Example 129 includes the subject matter of any one of Examples 115-128, and optionally, comprising processing a beacon comprising the announcement element.

Example 130 includes the subject matter of any one of Examples 115-129, and optionally, wherein the first wireless station comprises a mobile device.

Example 131 includes a product including one or more tangible computer-readable non-transitory storage media comprising computer-executable instructions operable to, when executed by at least one computer processor, enable the at least one computer processor to implement operations at a first wireless station, the operations comprising processing an announcement element from a second wireless station, the announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission; and performing the one-sided location measurement by processing the NDP sounding transmission based on the one or more configuration fields of the announcement element.

Example 132 includes the subject matter of Example 131, and optionally, wherein the operations comprise processing a packet comprising the announcement element, the packet comprising the NDP sounding transmission subsequent to the announcement element.

Example 133 includes the subject matter of Example 131, and optionally, wherein the operations comprise processing an announcement packet comprising the announcement element from the second wireless station, and, subsequent to the announcement packet, processing an NDP comprising the NDP sounding transmission from the second wireless station.

Example 134 includes the subject matter of Example 133, and optionally, wherein the NDP is separated from the announcement packet by a Short Inter-Frame Space (SIFS).

Example 135 includes the subject matter of any one of Examples 131-134, and optionally, wherein the type of the one-sided location measurement comprises a ranging measurement, an Angle of Departure (AoD) measurement, or a combination of the ranging and AoD measurements.

Example 136 includes the subject matter of any one of Examples 131-135, and optionally, wherein the operations comprise, when the measurement type field is to indicate the one-sided location measurement comprises a ranging measurement, processing at least a neighbor list field of the announcement element to determine information relating to one or more neighbor wireless stations supporting the ranging measurement.

Example 137 includes the subject matter of Example 136, and optionally, wherein the announcement element comprises at least a precoding field comprising precoding information corresponding to the plurality of sounding preambles.

Example 138 includes the subject matter of any one of Examples 131-137, and optionally, wherein the operations comprise, when the measurement type field is to indicate the one-sided location measurement comprises an Angle of Departure (AoD) measurement, processing at least a tone to angle mapping field in the announcement element to determine a mapping between a plurality of AoDs and a plurality of tones of the NDP sounding transmission.

Example 139 includes the subject matter of any one of Examples 131-138, and optionally, wherein the operations comprise, when the measurement type field is to indicate the one-sided location measurement comprises an Angle of Departure (AoD) measurement, processing at least a preamble to antenna mapping field in the announcement element to determine a mapping between a plurality of antennas and the plurality of sounding preambles.

Example 140 includes the subject matter of any one of Examples 131-139, and optionally, wherein the operations comprise, when the measurement type field is to indicate the one-sided location measurement comprises an Angle of Departure (AoD) measurement, processing at least a calibration field in the announcement element to determine information to calibrate measurements on the NDP sounding transmission.

Example 141 includes the subject matter of any one of Examples 131-140, and optionally, wherein the operations comprise processing at least an NDP mapping field in the announcement element to determine a count of the plurality of sounding preambles, and which sounding preambles are to be used for the one-sided location measurement.

Example 142 includes the subject matter of any one of Examples 131-141, and optionally, wherein the operations comprise processing at least a scheduling field in the announcement element to determine a schedule of one or more subsequent announcement element transmissions.

Example 143 includes the subject matter of any one of Examples 131-142, and optionally, wherein the operations comprise processing at least a Time of Departure (ToD) information field in the announcement element to determine at least a ToD of the announcement element, a ToD of the NDP sounding transmission, and a ToD accuracy.

Example 144 includes the subject matter of any one of Examples 131-143, and optionally, wherein the operations comprise processing at least a channel information field in the announcement element to determine information corresponding to a wireless channel over which the NDP sounding transmission is to be received.

Example 145 includes the subject matter of any one of Examples 131-144, and optionally, wherein the operations comprise processing a beacon comprising the announcement element.

Example 146 includes the subject matter of any one of Examples 131-145, and optionally, wherein the first wireless station comprises a mobile device.

Example 147 includes an apparatus of wireless communication by a first wireless station, the apparatus comprising means for processing an announcement element from a second wireless station, the announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission; and means for performing the one-sided location measurement by processing the NDP sounding transmission based on the one or more configuration fields of the announcement element.

Example 148 includes the subject matter of Example 147, and optionally, comprising means for processing a packet comprising the announcement element, the packet comprising the NDP sounding transmission subsequent to the announcement element.

Example 149 includes the subject matter of Example 147, and optionally, comprising means for processing an announcement packet comprising the announcement element from the second wireless station, and, subsequent to the announcement packet, processing an NDP comprising the NDP sounding transmission from the second wireless station.

Example 150 includes the subject matter of Example 149, and optionally, wherein the NDP is separated from the announcement packet by a Short Inter-Frame Space (SIFS).

Example 151 includes the subject matter of any one of Examples 147-150, and optionally, wherein the type of the one-sided location measurement comprises a ranging measurement, an Angle of Departure (AoD) measurement, or a combination of the ranging and AoD measurements.

Example 152 includes the subject matter of any one of Examples 147-151, and optionally, comprising means for, when the measurement type field is to indicate the one-sided location measurement comprises a ranging measurement, processing at least a neighbor list field of the announcement element to determine information relating to one or more neighbor wireless stations supporting the ranging measurement.

Example 153 includes the subject matter of Example 152, and optionally, wherein the announcement element comprises at least a precoding field comprising precoding information corresponding to the plurality of sounding preambles.

Example 154 includes the subject matter of any one of Examples 147-153, and optionally, comprising means for, when the measurement type field is to indicate the one-sided location measurement comprises an Angle of Departure (AoD) measurement, processing at least a tone to angle mapping field in the announcement element to determine a mapping between a plurality of AoDs and a plurality of tones of the NDP sounding transmission.

Example 155 includes the subject matter of any one of Examples 147-154, and optionally, comprising means for, when the measurement type field is to indicate the one-sided location measurement comprises an Angle of Departure (AoD) measurement, processing at least a preamble to antenna mapping field in the announcement element to determine a mapping between a plurality of antennas and the plurality of sounding preambles.

Example 156 includes the subject matter of any one of Examples 147-155, and optionally, comprising means for, when the measurement type field is to indicate the one-sided location measurement comprises an Angle of Departure (AoD) measurement, processing at least a calibration field in the announcement element to determine information to calibrate measurements on the NDP sounding transmission.

Example 157 includes the subject matter of any one of Examples 147-156, and optionally, comprising means for processing at least an NDP mapping field in the announcement element to determine a count of the plurality of sounding preambles, and which sounding preambles are to be used for the one-sided location measurement.

Example 158 includes the subject matter of any one of Examples 147-157, and optionally, comprising means for processing at least a scheduling field in the announcement element to determine a schedule of one or more subsequent announcement element transmissions.

Example 159 includes the subject matter of any one of Examples 147-158, and optionally, comprising means for processing at least a Time of Departure (ToD) information field in the announcement element to determine at least a ToD of the announcement element, a ToD of the NDP sounding transmission, and a ToD accuracy.

Example 160 includes the subject matter of any one of Examples 147-159, and optionally, comprising means for processing at least a channel information field in the announcement element to determine information corresponding to a wireless channel over which the NDP sounding transmission is to be received.

Example 161 includes the subject matter of any one of Examples 147-160, and optionally, comprising means for processing a beacon comprising the announcement element.

Example 162 includes the subject matter of any one of Examples 147-161, and optionally, comprising a mobile device.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a wireless station to:
    transmit an announcement element to announce a Non-Data Packet (NDP) sounding transmission comprising a plurality of sounding preambles, the announcement element configured to indicate a configuration of a one-sided location measurement to be processed by a receiver of the NDP sounding transmission, the announcement element comprising at least a measurement type field to indicate a type of the one-sided location measurement, am one or more configuration fields comprising configuration information to configure the one-sided location measurement based on the NDP sounding transmission, wherein the announcement element comprises at least an NDP mapping field to indicate a count of the plurality of sounding preambles and which sounding preambles are to be used for the one-sided location measurement; and
    transmit the NDP sounding transmission subsequent to the announcement element.

2. The apparatus of claim 1 configured to cause the wireless station to transmit a packet comprising the announcement element, the packet comprising the NDP sounding transmission subsequent to the announcement element.

3. The apparatus of claim 1 configured to cause the wireless station to transmit an announcement packet comprising the announcement element, and, subsequent to the announcement packet, to transmit an NDP comprising the NDP sounding transmission.

4. The apparatus of claim 1, wherein the type of the one-sided location measurement comprises a ranging measurement, an Angle of Departure (AoD) measurement, or a combination of the ranging and AoD measurements.

5. The apparatus of claim 1 configured to cause the wireless station to, when the one-sided location measurement comprises a ranging measurement, include in the announcement element at least a neighbor list field comprising information relating to one or more neighbor wireless stations supporting the ranging measurement.

6. The apparatus of claim 5, wherein the announcement element comprises at least a precoding field comprising precoding information corresponding to the plurality of sounding preambles.

7. The apparatus of claim 1 configured to cause the wireless station to, when the one-sided location measurement comprises an Angle of Departure (AoD) measurement, include in the announcement element at least a tone to angle mapping field to indicate a mapping between a plurality of AoDs and a plurality of tones of the NDP sounding transmission.

8. The apparatus of claim 1 configured to cause the wireless station to, when the one-sided location measurement comprises an Angle of Departure (AoD) measurement, include in the announcement element at least a preamble to antenna mapping field to indicate a mapping between a plurality of antennas and the plurality of sounding preambles.

9. The apparatus of claim 1 configured to cause the wireless station to, when the one-sided location measurement comprises an Angle of Departure (AoD) measurement, include in the announcement element at least a calibration field comprising information to calibrate measurements on the NDP sounding transmission.

10. The apparatus of claim 1, wherein the announcement element comprises at least a Time of Departure (ToD) information field comprising at least a ToD of the announcement element, a ToD of the NDP sounding transmission, and a ToD accuracy.

11. The apparatus of claim 1, wherein the announcement element comprises at least a channel information field comprising information corresponding to a wireless channel over which the NDP sounding transmission is to be transmitted.

12. The apparatus of claim 1 comprising a radio, one or more antennas, a memory and a processor.

13. A product including one or more tangible computer-readable non-transitory storage media comprising computer-executable instructions operable to, when executed by at least one processor, enable the at least one processor to cause a wireless station to:
    transmit an announcement element to announce a Non-Data Packet (NDP) sounding transmission comprising a plurality of sounding preambles, the announcement element configured to indicate a configuration of a one-sided location measurement to be processed by a receiver of the NDP sounding transmission, the announcement element comprising at least a measurement type field to indicate a type of the one-sided location measurement, and one or more configuration fields comprising configuration information to configure the one-sided location measurement based on the NDP sounding transmission, wherein the announcement element comprises at least a channel information field comprising information corresponding to a wireless channel over which the NDP sounding transmission is to be transmitted; and transmit the NDP sounding transmission subsequent to the announcement element.

14. The product of claim 13, wherein the instructions, when executed, cause the wireless station to transmit a packet comprising the announcement element, the packet comprising the NDP sounding transmission subsequent to the announcement element.

15. The product of claim 13, wherein the type of the one-sided location measurement comprises a ranging measurement, an Angle of Departure (AoD) measurement, or a combination of the ranging and AoD measurements.

16. The product of claim 13, wherein the announcement element comprises at least a Time of Departure (ToD) information field comprising at least a ToD of the announcement element, a ToD of the NDP sounding transmission, and a ToD accuracy.

17. An apparatus comprising circuitry and logic configured to cause a first wireless station to:

process an announcement element from a second wireless station, the announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission, processing the announcement element comprises processing at least a Time of Departure (ToD) information field in the announcement element to determine at least a ToD of the announcement element, a ToD of the sounding transmission, and a Tod accuracy; and perform the one-sided location measurement by processing the NDP sounding transmission based on the one or more configuration fields of the announcement element.

18. The apparatus of claim 17 configured to cause the first wireless station to process a packet comprising the announcement element, the packet comprising the NDP sounding transmission subsequent to the announcement element.

19. The apparatus of claim 17, wherein the type of the one-sided location measurement comprises a ranging measurement, an Angle of Departure (AoD) measurement, or a combination of the ranging and AoD measurements.

20. The apparatus of claim 17 configured to cause the first wireless station to, when the measurement type field is to indicate the one-sided location measurement comprises an Angle of Departure (AoD) measurement, process at least a tone to angle mapping field in the announcement element to determine a mapping between a plurality of AoDs and a plurality of tones of the NDP sounding transmission.

21. The apparatus of claim 17 comprising a radio, one or more antennas, a memory and a processor.

22. A product including one or more tangible computer-readable non-transitory storage media comprising computer-executable instructions operable to, when executed by at least one processor, enable the at least one processor to cause a first wireless station to:

process an announcement element from a second wireless station, the announcement element to announce a Non-Data Packet (NDP) sounding transmission comprising a plurality of sounding preambles, the announcement element comprising at least a measurement type field to indicate a type of a one-sided location measurement, and one or more configuration fields comprising configuration information to configure the one-sided location measurement based on the NDP sounding transmission, wherein the announcement element comprises at least an NDP mapping field to indicate a count of the plurality of sounding preambles, and which sounding preambles are to be used for the one-sided location measurement; and perform the one-sided location measurement by processing the NDP sounding transmission based on the one or more configuration fields of the announcement element.

23. The product of claim 22, wherein the instructions, when executed, cause the first wireless station to process a packet comprising the announcement element, the packet comprising the NDP sounding transmission subsequent to the announcement element.

24. The product of claim 22, wherein the type of the one-sided location measurement comprises a ranging measurement, an Angle of Departure (AoD) measurement, or a combination of the ranging and AoD measurements.

* * * * *

UNITED STATES PATENT AND TRADEMARK OFFICE
CERTIFICATE OF CORRECTION

PATENT NO. : 10,209,340 B2
APPLICATION NO. : 15/281105
DATED : February 19, 2019
INVENTOR(S) : Yuval Amizur et al.

Page 1 of 1

It is certified that error appears in the above-identified patent and that said Letters Patent is hereby corrected as shown below:

In the Claims

In Column 39, Line 51, in Claim 1, delete "measurement, am one" and insert -- measurement, and one --, therefor.

In Column 39, Line 57, in Claim 1, delete "preambles and which" and insert -- preambles, and which --, therefor.

In Column 41, Line 35, in Claim 17, delete "a ToD of the sounding" and insert -- a ToD of the NDP sounding --, therefor.

In Column 41, Line 35, in Claim 17, delete "a Tod accuracy;" and insert -- a ToD accuracy; --, therefor.

Signed and Sealed this
Second Day of April, 2019

Andrei Iancu
*Director of the United States Patent and Trademark Office*